Dec. 17, 1968  G. T. KEAHL ET AL  3,416,864
CIRCULAR VARIABLE INTERFERENCE FILTER MONOCHROMATOR
Filed April 29, 1965  2 Sheets-Sheet 1

INVENTORS
GERALD T. KEAHL
NICO J. VAN SLOOTEN
BY
ATTORNEY

United States Patent Office 3,416,864
Patented Dec. 17, 1968

3,416,864
CIRCULAR VARIABLE INTERFERENCE FILTER MONOCHROMATOR
Gerald T. Keahl, Fullerton, and Nico J. Van Slooten, Chino, Calif., assignors to Beckman Instruments, Inc., a corporation of California
Filed Apr. 29, 1965, Ser. No. 451,950
2 Claims. (Cl. 356—100)

ABSTRACT OF THE DISCLOSURE

There is disclosed a monochromator utilizing a circular variable interference filter rotatable with respect to a pair of slit jaws. The slit jaws are spring mounted and moved by an actuator driven by a cam through a cam follower which moves the actuator along the length of the spring.

---

This invention relates generally to monochromators and more particularly to monochromators of the type utilizing variable interference filters as a wavelength selecting element.

The multilayer interference filter is generally produced by a carefully designed stack of layers of alternate high and low refractive index material on a suitable substrate. The layers may be deposited by vacuum evaporation on a suitable substrate material, such, for example, as quartz, sapphire or germanium, depending upon the wavelength region involved. If there is no substantial difference in the refractive index or transmission characteristics of the layer materials, the difference in the physical characteristics of a filter coated for the transmission of a wavelength $\lambda$ and one coated for the transmission of a wavelength $2\lambda$ is that all layers or coatings in the stack are twice as thick. By applying the coatings to the substrate in such a manner that the thickness of each layer varies linearly along the substrate, the wavelength band transmitted by a small segment of the filter will also vary linearly along the filter. If the coatings are applied to a circular blank of substrate material in such a manner that the thickness of each layer varies linearly as a function of angle, the wavelength transmitted by the resultant filter will also vary linearly as a function of angle.

By proper design, a narrow band-pass filter can be produced and the higher and lower orders of the transmitted wavelength can be eliminated by deposition on the opposite side of the substrate of a variable wide band-pass filter.

By proper design the variable interference filter may be made of the narrow band-pass type and any small segment thereof will have the characteristics of a spike filter. If the wavelength varies linearly along the substrate the half intensity bandwidth of the spike will be a constant when expressed as a percentage of wavelength. Since the wavelength is a linear function of the position along the filter, the half intensity bandwidth is also a linear function of filter position. In order to obtain maximum resolution and maximum energy it is necessary to provide a pie-shaped slit and to control the geometric slit width or the physical separation of the slit jaws such that they correspond to the half intensity bandwidth.

It is therefore a principal object of this invention to provide a monochromator utilizing a variable interference filter having a constant resolution when expressed as a percentage of wavelength.

Another object is to provide a variable interference filter monochromator in which maximum energy is obtained while maintaining constant resolution when expressed as a percentage of wavelength.

Still another object is to provide a variable interference filter monochromator utilizing a variable slit mechanism controlled in a manner to obtain maximum energy while maintaining constant resolution when expressed as a percentage of wavelength.

A further object of the present invention is to provide a variable slit mechanism suitable for use with a variable interference filter and which maintains maximum energy transmission while providing constant resolution when expressed as a percentage of wavelength.

A more specific object of this invention is to provide a variable slit mechanism particularly adapted for use with a circular variable interference filter in which the slit width varies linearly as a function of angular position of the filter.

Other objects and many attendant advantages of the present invention will become more readily apparent to those skilled in the art as the same becomes better understood by reference to the following detailed description when considered in connection with the accompanying drawings wherein.

Figure 2:
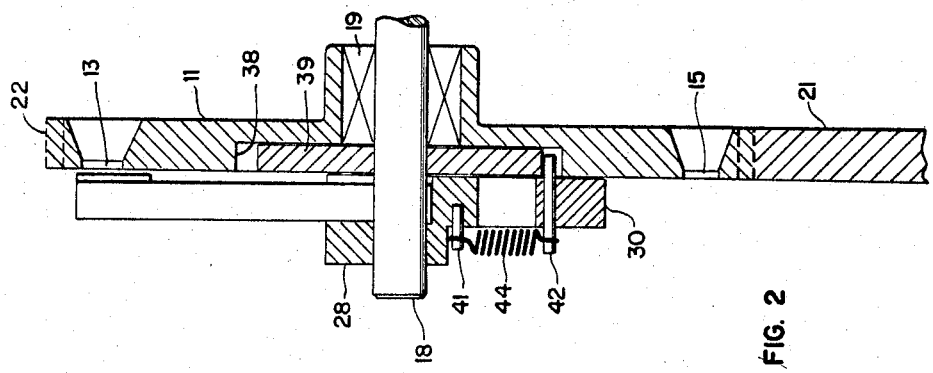
FIG. 2 illustrates a cross section of the embodiment of FIG. 1 taken along line 2—2.
Figure 1:
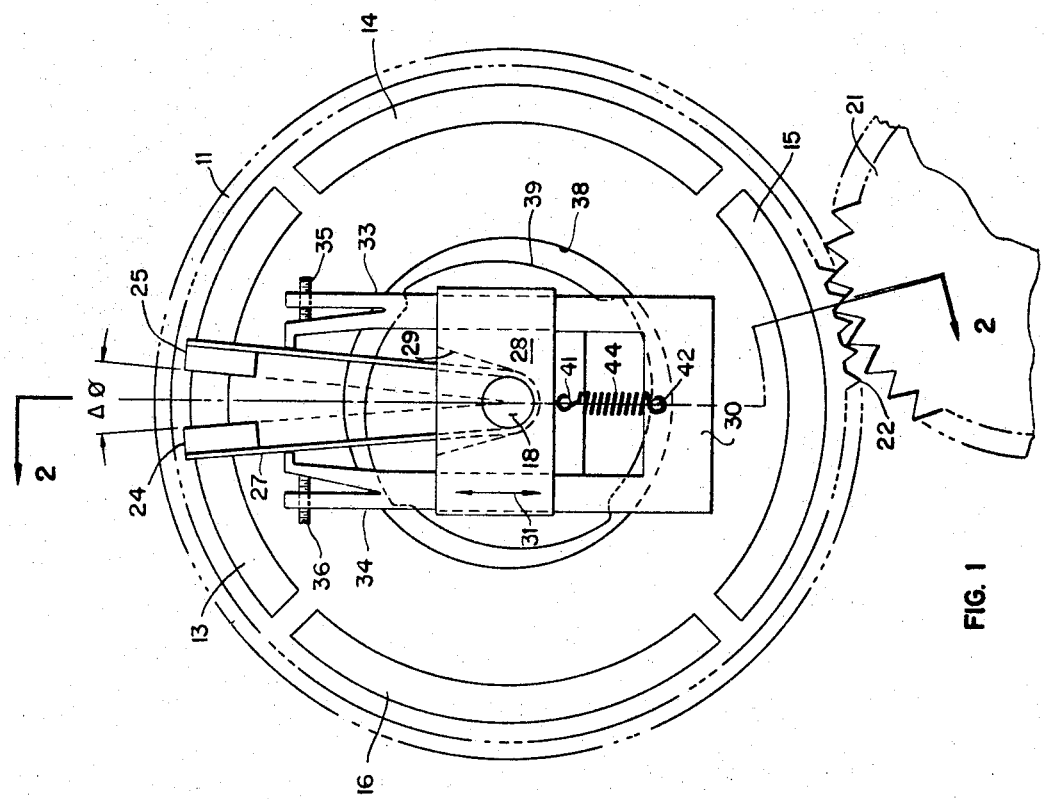
FIG. 1 illustrates a plan view of a four segment, circular variable interference filter and a preferred embodiment of a variable slit mechanism for use therewith.

Referring now to FIGS. 1 and 2, there is illustrated a rotatable filter support or wheel 11 having four circular variable interference filters 13–16 secured therein in any suitable manner. Filter wheel 11 may be rotated about shaft 18 on bearing 19 in any suitable manner such, for example, as by drive gear 21 engaging gear teeth 22 formed on the periphery of the holder. Drive gear 21 may be driven by a wavelength scan motor in the manner well known in the art or filter wheel 11 rotated by hand.

A pair of slit jaws 24 and 25 are positioned closely adjacent the annulus filter sectors such that the extension of the slit forming edges intersect at the center of rotation of filter wheel 11. For maximum benefit, slit jaws 24 and 25 must be in substantial contact with the narrow band-pass side of the filter and are spaced therefrom a few thousandths of an inch. The slit jaws thus allow radiation to pass through a small sector of the filter determined by the angular spacing $\Delta\theta$ of the slit jaws. Slit jaws 24 and 25 are supported at the extremities of a thin piece of spring material 27 formed in a U-shape and secured against shaft 18 by mounting and guide block 28. Shaft 18 is secured within guide block 28 which has a U-shaped slot 29 formed therein to receive the slit jaw support spring 27. Slot 29 also limits the outward expansion of spring support 27.

Actuator 30 is movable in the plane of the slit opening as indicated by the arrow 31 and is movably supported in a channel in guide and support block 28. The extending arms 33 and 34 of actuator 30 are each bifurcated at the ends thereof and engage respective sides of spring support 27. Screws 35 and 36 provide a slit width adjustment as more fully described hereinafter.

A circular recess 38 is formed within filter wheel 11 to receive a cam 39 secured to wheel 11 in any suitable manner such as a key, not shown, and accordingly rotates therewith. Pins 41 and 42 are secured respectively within support block 28 and actuator 30. Pin 42 extends through actuator 30 and is spring loaded against cam 39 by spring 44 connected between pins 41 and 42.

As filter wheel 11 is rotated about shaft 18 carrying therewith cam 39, actuator 30 raises and lowers along guide block 28 as pin 42 follows the surface of cam 39. As actuator 30 raises and lowers, the slit opening $\Delta\theta$ defined by slit jaws 24 and 25 increases and decreases since the slit jaw support spring 27 spring loads against arms 33 and 34 of actuator 30. Set screws 35 and 36 within the bifurcated ends of arms 33 and 34 allow for initial adjustment of the slit opening by flexing the inner fork of the bifurcated ends.

Figure 3:
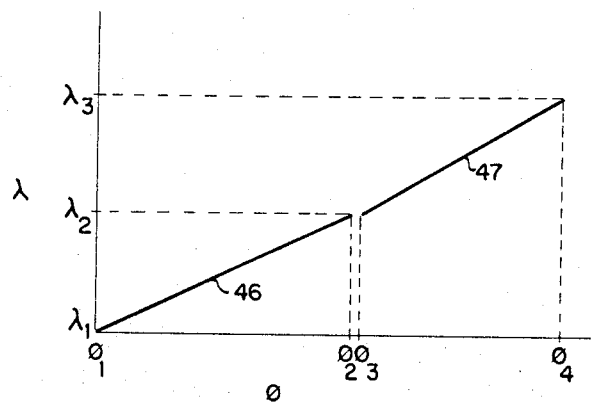
FIG. 3 illustrates the change in wavelength as a function of angular position of the filter of FIG. 1 for two segments thereof.

Referring now to FIG. 3 there is illustrated the wavelength characteristic of interference filter sectors 13 and 14 as a function of angular position of filter wheel 11. Line 46 represents the transmission characteristic of filter sector 13 and varies linearly from $\lambda_1$ to $\lambda_2$ as filter wheel 11 rotates from $\theta_1$ to $\theta_2$. If sector 14 is intended to cover the wavelength region from $\lambda_2$ to $\lambda_3$ a slight overlap of wavelength is generally allowed and curve 47 indicates the transmission characteristic of sector 14 as filter wheel 11 rotates from $\theta_3$ to $\theta_4$. It will be noted that in each case the wavelength varies linearly as a function of angle although the rate of change of wavelength as a function of angular rotation, i.e., the slope of the line, may differ from one sector to another.

Figure 4:
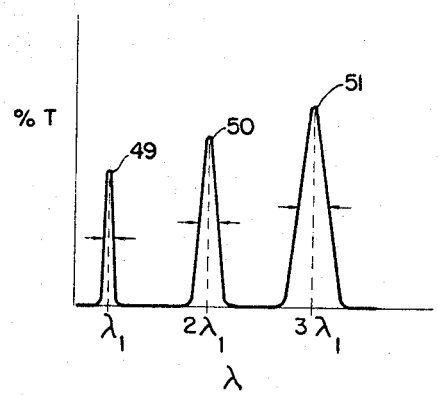
FIG. 4 illustrates the transmission band-pass characteristic of the filter at three angular positions.

Referring now to FIG. 4 there is illustrated the transmission characteristics of a circular variable interference filter sector which has been designed to have a linear change in wavelength as a function of angle. Curve 49 illustrates the transmission characteristics of the filter at $\lambda_1$ and the half intensity bandwidth is indicated by the arrows. If the filter is now moved to a wavelength equal to $2\lambda_1$ the transmission characteristic is illustrated by curve 50 and the half intensity bandwidth is twice that at $\lambda_1$. Similarly, at $3\lambda_1$ the half intensity bandwidth is three times that of $\lambda_1$ as illustrated by curve 51. Specifically, if the filter is designed to cover the region from 2.5 to $14\mu$ and has a resolution of 1% of the wavelength, the half intensity bandwidth at $2.5\mu$ will be $0.025\mu$. At a wavelength of $5\mu$ the half intensity bandwidth or resolution will be $0.05\mu$ and at $7.5\mu$ the resolution will be $0.075\mu$. In order to maintain maximum energy without loss of resolution it is necessary to maintain the geometric width of the slit in correspondence with the half intensity bandwidth. Since the resolution changes linearly as a function of angle, although is a constant when expressed as a percent of wavelength, it is necessary to program a slit opening $\Delta\theta$ to correspond to this change. By appropriately cutting the surface of cam 39 the geometric width of the slit $\Delta\theta$ may be made to correspond to the spectral slit width or half intensity bandwidth of the filter at any wavelength.

The formation of the circular variable interference filters as sectors as illustrated in the embodiment of FIG. 1 is not essential and may be formed on a continuous annulus substrate so as to vary linearly from $\lambda_1$ to $\lambda_2$ over a rotation of any angle $\theta$, such as 270° or, in the alternative, may be arranged to vary from $\lambda_1$ at a 0° reference position to $\lambda_2$ at the 180° position with a mirror image of the coating from 180° to 360°. Thus, when the filter is rotated in one direction the wavelength continuously changes from $\lambda_1$ to $\lambda_2$ and back to $\lambda_1$.

It should also be understood that the utilization of a separate cam 39 is not essential and the same result may be accomplished by forming a cam track in the material forming the filter wheel 11. It should also be understood that the interference filter need not be circular but may be made on a linear substrate. In such instance, the wavelength may be made to vary linearly as a function of filter position. A pie-shaped slit need not be utilized and the geometric width of the slit jaws would be controlled as a function of wavelength or linear position of the filter. Obviously, many differing mechanisms may be designed for this purpose. The variable slit with a linear filter does, however, retain the function of transmitting maximum energy while maintaining constant resolution when expressed as a percentage of wavelength.

There has been illustrated and described a monochromator of the type utilizing a variable interference filter which provides constant resolution as a percentage of wavelength and one preferred embodiment of a variable slit mechanism for utilization therewith. Obviously many modifications and variations may be made in the particular variable slit mechanisms without departing from the spirit and scope of this invention as defined in the appended claims.

What is claimed is:

1. A monochromator comprising:
a circular variable interference filter in the form of at least a sector of an annulus; said filter having a linearly varying wavelength transmission characteristic as a function of annular position;
means rotatably mounting said filter;
a pair of slit jaws defining a slit aperture;
spring means mounting said slit jaws such that the extension of the surface of said slit jaws defining the slit aperture intersect at the center of rotation of said filter;
actuator means restraining said spring means and movable along the length thereof;
cam means rotating in synchronism with said filter;
cam follower means coupling said actuator and said cam for moving said actuator thereby to control the slit aperture defined by said pair of slit jaws as a function of angular position of said filter; and
means supporting said slit jaws to define a beam path through a section of said filter.

2. A monochromator comprising:
a circular variable interference filter in the form of at least a sector of an annulus; said filter having a linearly varying wavelenth transmission characteristic as a function of annular position;
means rotatably mounting said filter;
a pair of slit jaws defining a slit aperture;
spring means mounting said slit jaws such that the extension of the surface of said slit jaws defining the slit aperture intersect at the center of rotation of said filter;
actuator means restraining said spring means and movable along the length thereof;
cam means rotating in synchronism with said filter;
cam follower means coupling said actuator and said cam for moving said actuator thereby to control the slit aperture defined by said pair of slit jaws as a function of angular position of said filter;
means supporting said slit jaws to define a beam path through a sector of said filter; and
means on said actuator means for initially adjusting the slit aperture defined by said slit jaws.

References Cited

UNITED STATES PATENTS

| 2,587,602 | 3/1952 | Crandell. | |
| 2,654,287 | 10/1953 | Luft. | |
| 2,708,389 | 5/1955 | Kavanagh | 350—166 |
| 2,734,991 | 2/1956 | Shapiro. | |
| 2,865,247 | 12/1958 | Crandell et al. | |
| 2,941,444 | 6/1960 | Frykman | 350—166 X |
| 2,971,430 | 2/1961 | Rohner et al. | |

JEWELL H. PEDERSON, *Primary Examiner.*

F. L. EVANS, *Assistant Examiner.*

U.S. Cl. X.R.

350—271, 315